United States Patent
Becker et al.

(10) Patent No.: US 8,064,557 B1
(45) Date of Patent: Nov. 22, 2011

(54) PROGRAMMABLE SYNCHRONIZATION UNIT FOR A SIGNAL RECEIVER

(75) Inventors: Burkhard Becker, Ismaning (DE); Markus Doetsch, Schliern (CH); Peter Jung, Otterberg (DE); Tideya Kella, Munich (DE); Joerg Plechinger, Munich (DE); Peter Schmidt, Ellerstady (DE); Sven Simon, Bremen (DE); Michael Schneider, Munich (DE)

(73) Assignee: Infineon Technologies AG, Munich (DE)

(*) Notice: Subject to any disclaimer, the term of this patent is extended or adjusted under 35 U.S.C. 154(b) by 1405 days.

(21) Appl. No.: 10/130,725

(22) PCT Filed: Nov. 17, 2000

(86) PCT No.: PCT/EP00/11479
§ 371 (c)(1),
(2), (4) Date: Aug. 13, 2002

(87) PCT Pub. No.: WO01/37476
PCT Pub. Date: May 25, 2001

(30) Foreign Application Priority Data

Nov. 19, 1999 (DE) .................................. 199 55 757

(51) Int. Cl.
H04L 7/00 (2006.01)
(52) U.S. Cl. ........ 375/354; 375/130; 375/136; 375/142; 375/147; 375/149; 375/150; 375/316; 375/340; 375/342; 375/343
(58) Field of Classification Search .................. 375/354, 375/368, 365, 366, 316; 370/84, 82, 105, 370/280, 324, 337, 350, 470, 503, 514
See application file for complete search history.

(56) References Cited

U.S. PATENT DOCUMENTS

| 4,403,287 | A | * | 9/1983 | Blahut et al. | ..................... 712/42 |
| 4,894,842 | A | | 1/1990 | Broekhoven et al. | ............. 375/1 |
| 5,237,586 | A | * | 8/1993 | Bottomley | ..................... 370/206 |
| 5,509,036 | A | | 4/1996 | Nakata | ........................... 375/368 |
| 5,680,421 | A | | 10/1997 | Shiino et al. | .................. 375/368 |
| 5,764,687 | A | * | 6/1998 | Easton | ........................... 375/147 |

(Continued)

FOREIGN PATENT DOCUMENTS

DE 42 26 952 A1 2/1994
(Continued)

OTHER PUBLICATIONS

Swales, S.C., et al., *The U.K. Link Personal Communications Prooramme: Downlink Synchronisation for a DS-CDMA Field Trial System*, IEEE, 1995, pp. 784-788.

*Primary Examiner* — Chieh M Fan
*Assistant Examiner* — Sophia Vlahos
(74) *Attorney, Agent, or Firm* — Maginot Moore & Beck

(57) ABSTRACT

A programmable synchronizing unit for a signal receiver has a received data memory for buffering received data, a correlation value data memory for storing correlation values, a data path for correlating the received data with the correlation values, a result data memory for buffering the received data correlated with the correlation values by means of the data path, and a control unit for addressing the received data memory, the result data memory and the correlation value data memory (26) and for controlling the data path as a function of a synchronization program which is stored in a program memory.

7 Claims, 3 Drawing Sheets

U.S. PATENT DOCUMENTS

| | | | | |
|---|---|---|---|---|
| 6,151,353 | A * | 11/2000 | Harrison et al. | 375/136 |
| 6,243,561 | B1 * | 6/2001 | Butler et al. | 340/7.42 |
| 6,366,606 | B1 * | 4/2002 | Sriram | 375/150 |
| 6,424,641 | B1 * | 7/2002 | Kotov | 370/342 |
| 6,611,512 | B1 * | 8/2003 | Burns | 370/342 |

FOREIGN PATENT DOCUMENTS

| | | | |
|---|---|---|---|
| DE | 4226952 | * | 2/1994 |
| JP | 4-196936 A | | 7/1992 |

\* cited by examiner

PROGRAMMABLE SYNCHRONIZATION UNIT FOR A SIGNAL RECEIVER

The invention relates to a programmable synchronizing unit for a signal receiver, in particular a mobile radio receiver for mobile radio networks with a cellular structure.

Analog and digital mobile radio systems are structured according to the cellular principle, each cell being supplied by a base station. The main advantage of the cell structure is the re-use of identical RF channels and the ability to supply areas of any desired extent. There are generally a plurality of possible propagation paths between a base station and a mobile station. Reflection and scattering of waves at buildings, mountains, trees and other obstacles leads to the reception signals being composed of a plurality of components which generally have different strengths and are delayed to differing degrees. The individual components can be superimposed either constructively or destructively, depending on the size of the relative phase difference between the waves. A mobile receiver which moves from one location to the other travels through regions with continuously changing phase relations between the different incident waves. The delay of the different signal components is calculated in the receiver, with the result that the various signal components can be composed with what is referred to as a Rake circuit. The digital received signal is composed of a multiplicity of data time frames which are in turn divided into data time slots. The data time frames and the data time slots each contain synchronization data sequences for their detection by the receiver. By means of these synchronization sequences contained in the received signal, the receiver can synchronize itself with the received signal and, after it has been decoded, carry out the data processing of the received signal.

FIG. 1 shows a receiver for receiving the received signal, for example a QPSK signal as claimed in the prior art. The analog received signal is fed to an analog/digital converter for converting the received signal into digital received data. The desired reception channel is switched by means of a downstream bandpass filter. The data received in the channel is buffered in a data memory, for example a data RAM. At the same time, the received data is fed to various modules which are referred to as search modules. The search modules are hardware circuits which carry out various specialized tasks. The search module A carries out here the time slot synchronization, the search module B carries out the time frame synchronization and the search module C carries out the signal delay calculation for the various signal components on the basis of the multipath propagation. The values which are determined are buffered in registers and fed to a central controller of the receiver, for example a DSP processor. Via control lines, the latter switches a switching device and a downstream Rake circuit as a function of the synchronization signal sequences found and the calculated signal delays. The received data contained in the time slots are decoded in a decoding device and fed to the further data processing means.

The synchronization procedures or cell-search procedures carried out by means of the search modules A, B, and the signal delay calculation of the reception channels by the search module C are carried out by non-coherent or coherent correlation of the received data with predetermined correlation data sequences which are predefined by the respective mobile radio standard. The correlation of the received data with the correlation data sequences is carried out here by means of simple arithmetic operations such as the formation of two's complements, logic operations on data, accumulation of a multiplicity of correlated values, squaring of data values and the like.

The search modules A, B, C which are implemented in accordance with the respective standard by means of circuit components are complex in terms of circuit technology and completely inflexible with respect to changes of specifications in the mobile radio standard. The implementation of the search modules in terms of circuit technology by means of hardware components also requires a large amount of space. This impedes miniaturization of the receiver, which is desirable in particular in mobile radio receivers. The main disadvantage of the use of various hardware search modules A, B, C for performing various tasks in received signal synchronization and signal delay calculation on the basis of multipath propagation is that even the smallest changes in the specifications in the standard lead to a situation in which the implemented search modules A, B, C can no longer be used.

It is therefore the object of the present invention to provide a synchronizing unit for a signal receiver which can be programmed to carry out the various synchronizing operations.

This object is achieved according to the invention by means of the programmable synchronizing unit having the features disclosed in Patent claim 1.

The programmable synchronizing unit according to the invention also provides the advantage that a greatly reduced area is taken up than in the case of the previous search modules according to the prior art.

A further advantage of the programmable synchronizing unit according to the invention is that the complexity in terms of circuit technology is reduced.

This also reduces susceptibility to faults and considerably simplifies the manufacturing process for manufacturing an integrated programmable synchronizing unit according to the invention.

The invention provides a programmable synchronizing unit for a signal receiver having
a received data memory for buffering received data,
a correlation value data memory for storing correlation values,
a data path for correlating the received data with the stored correlation values,
a result data memory for buffering the received data correlated with the correlation values by means of the data path, and having
a control unit for addressing the data memory, the result data memory and the correlation value data memory and for controlling the data path as a function of a synchronization program which is stored in a program memory and can be called.

According to one preferred development of the programmable synchronizing unit according to the invention, the result data memory is connected to a peak detector.

The control unit preferably has a separate address generator for the data memory, the result data memory and the correlation value data memory, respectively.

In one preferred embodiment, the program memory is connected to a configuration register into which a call instruction for calling a synchronization program can be written.

The control instructions of a called synchronization program are preferably written successively into an instruction register which is contained in the control unit.

In a further preferred embodiment, the data path has at least one read-in register and a plurality of calculation stages connected in series.

In one preferred development, the stored synchronization programs comprise a received-data time slot synchronization program, a received-data time frame synchronization program, at least one signal-delay calculation program and an encryption-code identification program.

A code generator for forming a correlation value code as a function of the addressed correlation values is preferably connected downstream of the correlation value data memory.

In a further preferred embodiment of the synchronizing unit according to the invention, the correlated received data can be fed back into the data path from the result data memory via feedback lines.

The peak detector is preferably connected to a central control unit of the signal receiver, which control unit actuates a switching device connected downstream of the received data memory, and a Rake circuit as a function of the peak value sensed by the peak detector.

A preferred embodiment of the synchronizing unit according to the invention will be described below in order to explain features which are essential to the invention.

Figure 1:
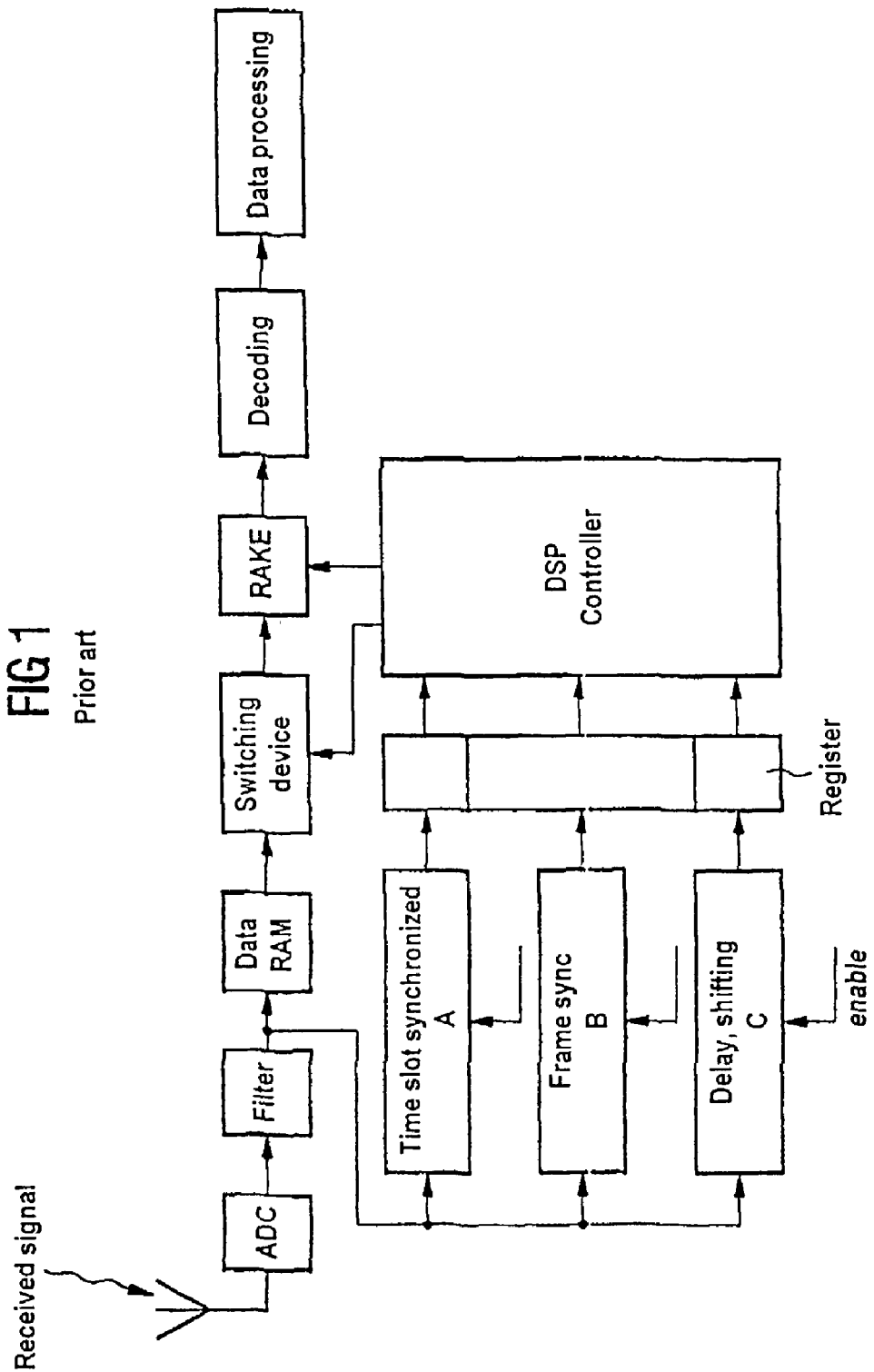
FIG. 1 shows a signal receiver according to the prior art.
Figure 2:
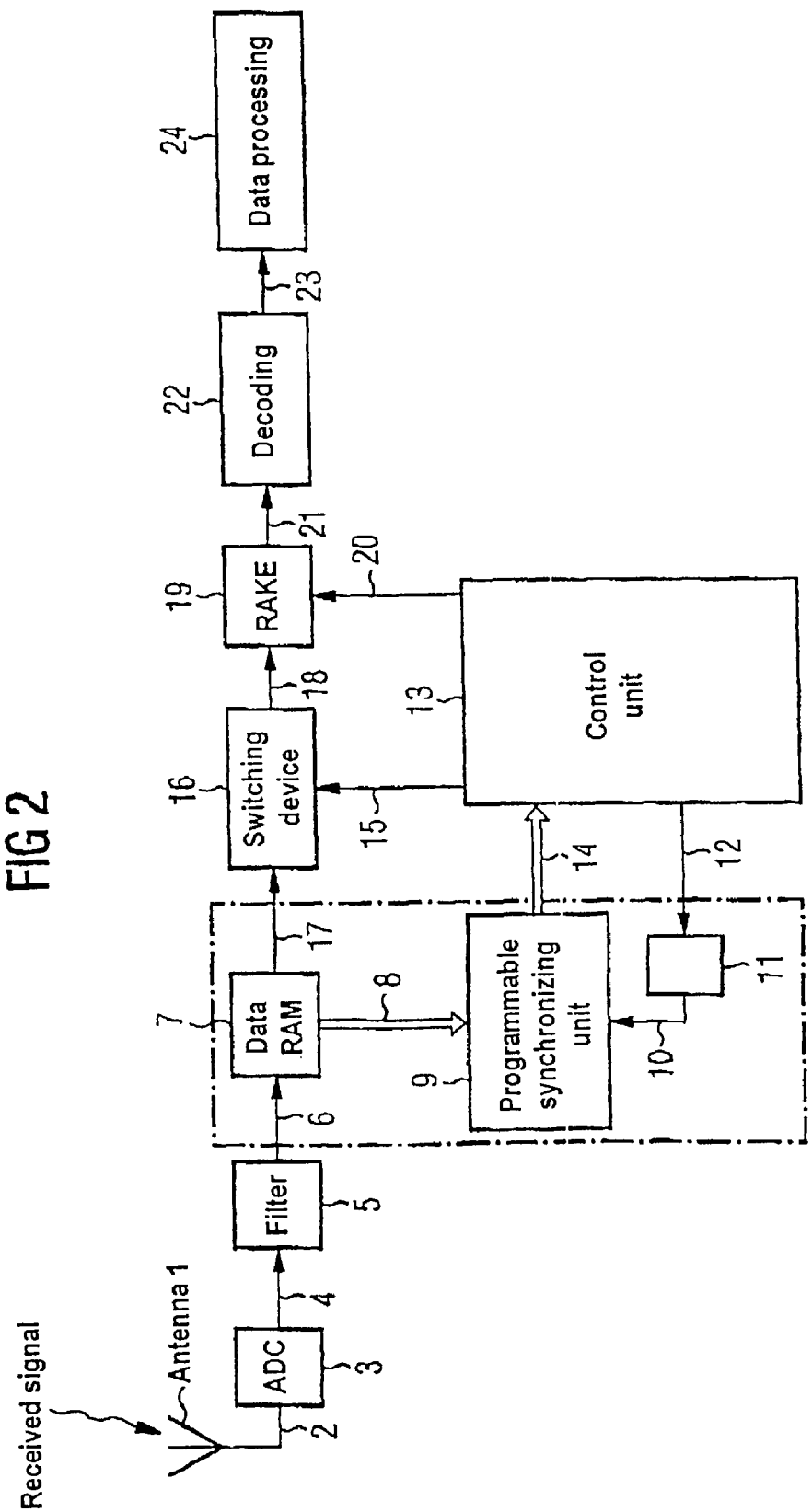
FIG. 2 shows a signal receiver having the programmable synchronizing unit according to the invention.

As is apparent from FIG. 2, a received signal, for example a QPSK received signal is received via an antenna 1 at the receiver which has the programmable synchronizing unit according to the invention. The received signal is fed via a line 2 to an analog/digital converter 3 for converting the received analog signal into digital received data. The digital received data is fed via a data line 4 to a bandpass filter 5 for band limiting. The bandpass filter 5 can be switched in order to select the channel. The received data of the selected channel is written into a received data memory 7 via a data line 6. The received data memory 7 is, for example, a RAM memory. The received data memory 7 is used to buffer the digital received data of the selected channel.

The received data memory 7 is connected via read-out lines 8 to the programmable synchronizing unit 9 according to the invention. The programmable synchronizing unit 9 is connected to a configuration register 11 via configuration lines 10. The configuration register 11 is itself connected via lines 12 to a central control unit 13 of the receiver, for example a DSP processor. The central control unit 13 writes a synchronization program call instruction into the configuration register 11 via the lines 12. Various synchronization programs are called in the programmable synchronizing unit 9 in accordance with the synchronization-program call instruction written into the configuration register. The programmable synchronizing unit 9 is connected to the central control unit 13 via output lines 14. Via a control line 15, the control unit 13 controls a switching device 16 which is connected at the input end to the received data memory 7 via data lines 17. At the output end, the circuit device 16 is connected via data lines 18 to a Rake circuit 19 which is controlled by the central control unit 13 via control lines 20. The Rake circuit 19 recomposes the various signal components of the received signal which have arisen owing to the multipath propagation, in accordance with the signal delay times determined by the programmable synchronizing unit 9. The composed received data signal which is formed by means of the Rake circuit 19 passes via a data line 21 to a decoding circuit 22. The decoding circuit 22 decodes the received data signal and outputs the decoded received data signal to a downstream data processing circuit 24 via a line 23.

Figure 3:
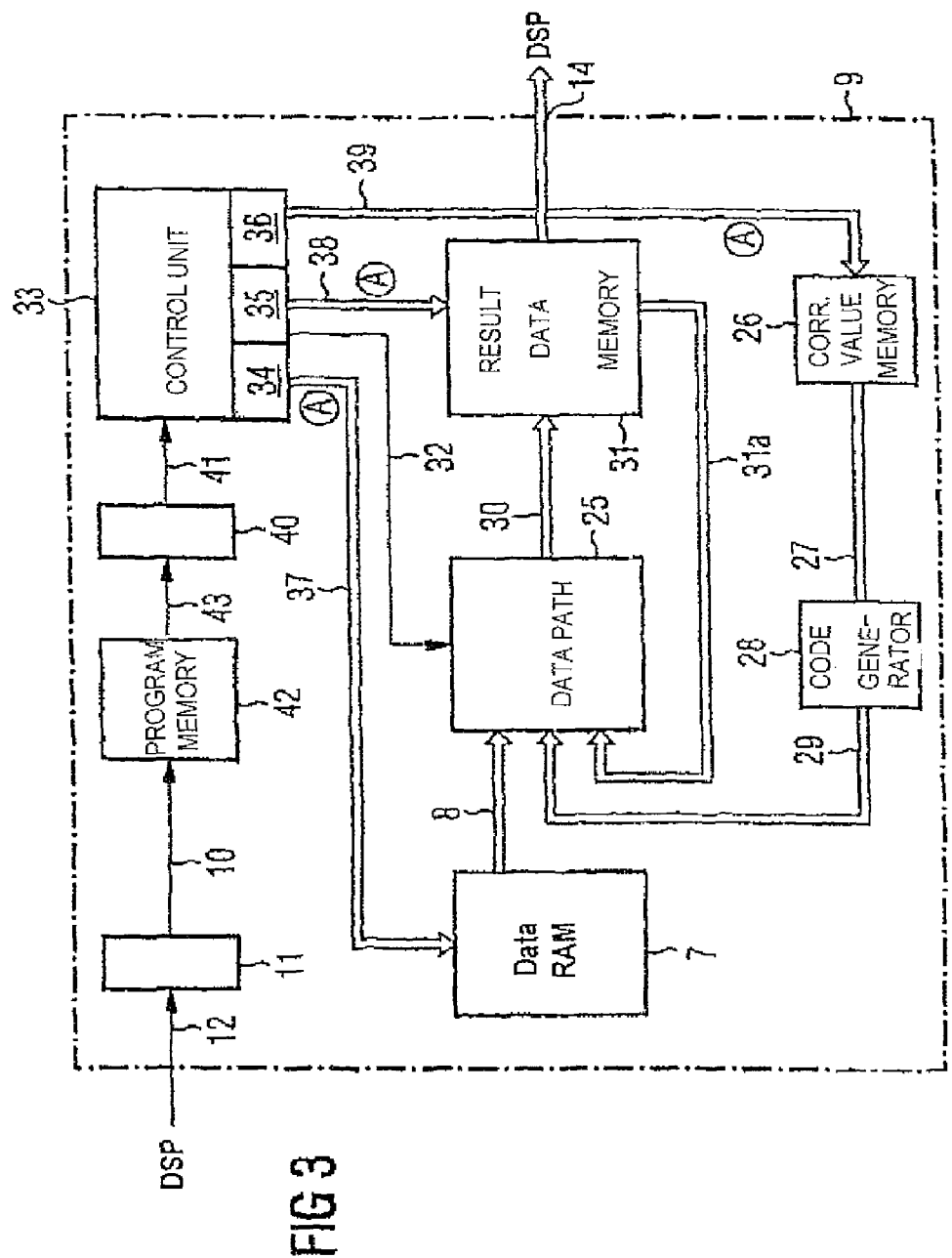
FIG. 3 shows the programmable synchronizing unit according to the invention in detail.

FIG. 3 shows the programmable synchronizing unit 9 according to the invention in detail.

The received data memory 7 is connected via the read-out line 8 to what is referred to as a data path 25 which preferably has at least one read-in register at the input end. The data path 25 of the programmable synchronizing unit 9 preferably has a plurality of calculation stages switched in series. The data path 25 functions as a correlation device for correlating the received data read out via the read-out lines 8 with correlation values which are stored in a correlation value data memory 26 of the programmable synchronizing unit 9.

The correlation value data memory 26 is preferably a fixed-value memory, for example a ROM memory. The correlation values stored in the ROM memory 26 are fed, in one preferred embodiment, via lines 27 to a code generator 28 which generates a correlation value code as a function of the correlation values addressed in the correlation value memory 26, which correlation value code is also fed via data lines 29 to the data path or to the correlation device 25. The data path 25 correlates the received data present on the lines 8 with the correlation value code data present on the lines 29.

The data path 25 outputs the correlated received data to a result data memory 31 via lines 30. The result data memory 31 is, for example, a volatile memory, in particular a RAM. The result data memory 31 is connected to a read-in register of the data path 25 via feedback lines 31 for feeding back result data.

The various calculation stages of the data path 25 can be actuated by means of a control unit 33 of the programmable synchronizing unit 9 via separate control lines 32. The control unit 33 also preferably has various address generators 34, 35, 36, the first address generator 34 serving to address the received data memory 7 via address lines 37, the second address generator 35 serving to address the result data memory 31 via address lines 38 and the address generator 36 serving to address the correlation value data memory 26 via address lines 39. The control unit 33 carries out the addressing of the data reception memory 7, of the result data memory 31 and the correlation value memory 26 and the control of the various calculation stages of the data path 25 as a function of a control instruction which is located in an instruction register 40. The instruction register 40 is connected to the control unit 33 via an instruction read-out line 41. Various control instructions of a synchronization program which is stored in a program memory 42 are written in succession into the instruction register 40 via lines 43. Various callable synchronization programs which each contain a plurality of control instructions are stored in the synchronization program memory 42. The program memory 42 is preferably a ROM memory. The various synchronization programs located in the program memory 42 are called by the configuration register 11 via the lines 10. Via the control lines 12, the configuration register 11 executes various synchronization-program call instructions which originate from the central control unit 13.

In one preferred embodiment, the control unit 33 of the programmable synchronizing unit 9 can actuate a peak detector which is connected downstream of the result memory 31. Alternatively, peak detection can also be carried out by the central control unit 13 itself.

The synchronization programs stored in the program memory 42 comprise all the instructions which are necessary for the receiver synchronization. In particular a time-slot synchronization program, a time-frame synchronization program and an encryption-code identification program are stored in the program memory 42.

In addition, various delay-calculation programs are stored with different degrees of precision in the program memory 42. The calculated time delay forms the basis for the actuation of the Rake circuit 19 by the central control unit 13.

The control unit 33 controls the individual calculation stages of the data path 25. For this purpose it selects, for example, various registers and activates or deactivates the various calculation stages. The various correlation programs which are stored in the program memory 42 can be executed in succession by the control unit 33. The control unit 33 executes the called synchronization microprograms by loading and incrementing the address values of the data reception memory 7, the result memory 31 and the correlation value memory 26, the control unit 33 having loop counting devices for the various microprocedures.

In one preferred embodiment, the correlation value memory 26 can be replaced in accordance with the respective received data standard. As a result it is possible to implement various synchronization detection data sequences for various received data standards in the programmable synchronizing unit and thus to ensure a high degree of flexibility in the use of the synchronizing unit 9 according to the invention. Furthermore, it is possible to adapt the synchronization microprocedures stored in the program memory 42 to the various requirements without having to change the rest of the hardware structure, in particular in the data path 25. The programmable synchronizing unit 9 according to the invention, as shown in FIG. 3, thus has a relatively low degree of complexity in terms of circuit technology accompanied by a high degree of flexibility.

| List of reference numerals | |
|---|---|
| 1 | Antenna |
| 2 | Data line |
| 3 | Analog/digital converter |
| 4 | Line |
| 5 | Bandpass filter |
| 6 | Line |
| 7 | Received data memory |
| 8 | Read-out line |
| 9 | Programmable synchronizing unit |
| 10 | Lines |
| 11 | Configuration register |
| 12 | Control lines |
| 13 | Central control unit |
| 14 | Output lines |
| 15 | Control line |
| 16 | Switching device |
| 17 | Lines |
| 18 | Lines |
| 19 | Rake circuit |
| 20 | Control lines |
| 21 | Lines |
| 22 | Decoder circuit |
| 23 | Lines |
| 24 | Data processing circuit |
| 25 | Data path |
| 26 | Correlation value data memory |
| 27 | Lines |
| 28 | Code generator |
| 29 | Lines |
| 30 | Data output lines |
| 31 | Result data memory |
| 31a | Feedback lines |
| 32 | Data-path control lines |
| 33 | Control unit |
| 34, 35, 36 | Address generators |
| 37, 38, 39 | Address lines |
| 40 | Instruction register |
| 41 | Lines |
| 42 | Program memory |
| 43 | Lines |

The invention claimed is:

1. A signal receiver, comprising:
  a programmable synchronizing unit including:
    a received data memory for buffering received data;
    a correlation value data memory for storing correlation values;
    a code generator connected downstream of the correlation value data memory for forming correlation value codes as a function of the stored correlation values;
    a controllable data path for correlating the received data with the correlation value codes;
    a result data memory for buffering the received data correlated with the correlation value codes values by means of the data path, the result data memory having an output for outputting the buffered correlated received data;
    a control unit for addressing the received data memory, the result data memory and the correlation value data memory and for controlling the data path as a function of a called synchronization program; and
    a program memory for storing synchronization programs for synchronizing the signal receiver, the program memory including an input for receiving a synchronization program call instruction which designates one of the synchronization programs;
  a rake circuit operably coupled to the received data memory for receiving the received data and including a control input for receiving a control signal, the rake circuit being configured to recompose the received data into a received data signal with reference to the control signal received at the input;
  a signal receiver control unit having an input connected to the output of the result data memory, a first output connected to the control input of the rake circuit, and a second output connected to the input of the program memory, the signal receiver control unit being configured to generate the control signal for the rake circuit based on the buffered correlated received data from the result data memory and to generate the synchronization program call instruction for the program memory;
  wherein the stored synchronization programs comprise a received-data time slot synchronization program, a received-data time frame synchronization program, at least one signal-delay calculation program and an encryption identification program wherein feedback lines are provided to feedback the correlated received data into the data path from the result data memory.

2. The signal receiver according to claim 1, wherein the result data memory is connected to a peak detector.

3. The signal receiver according to claim 1, wherein the control unit has an address generator for the received data memory, the result data memory and the correlation value data memory, respectively.

4. The signal receiver according to claim 1, wherein the program memory is connected to a configuration register into which an instruction for calling a synchronization program can be written.

5. The signal receiver according to claim 1, wherein the control instructions of a called control program are written successively into an instruction register.

6. The signal receiver according to claim 1, wherein the data path has at least one read-in register and a plurality of calculation stages connected in series.

7. A signal receiver, comprising:
  a programmable synchronizing unit including:
    a received data memory for buffering received data;
    a correlation value data memory for storing correlation values;
    a code generator connected downstream of the correlation value data memory for forming correlation value codes as a function of the stored correlation values;
    a controllable data path for correlating the received data with the correlation value codes;

a result data memory for buffering the received data correlated with the correlation value codes values by means of the data path, the result data memory having an output for outputting the buffered correlated received data;

a control unit for addressing the received data memory, the result data memory and the correlation value data memory and for controlling the data path as a function of a called synchronization program; and a program memory for storing synchronization programs for synchronizing the signal receiver, the program memory including an input for receiving a synchronization program call instruction which designates one of the synchronization programs;

a rake circuit operably coupled to the received data memory for receiving the received data and including a control input for receiving a control signal, the rake circuit being configured to recompose the received data into a received data signal with reference to the control signal received at the input;

a signal receiver control unit having an input connected to the output of the result data memory, a first output connected to the control input of the rake circuit, and a second output connected to the input of the program memory, the signal receiver control unit being configured to generate the control signal for the rake circuit based on the buffered correlated received data from the result data memory and to generate the synchronization program call instruction for the program memory, wherein feedback lines are provided to feedback the correlated received data into the data path from the result data memory.

* * * * *